(12) United States Patent
Murcia

(10) Patent No.: US 6,818,027 B2
(45) Date of Patent: Nov. 16, 2004

(54) ORGANICALLY CLEAN BIOMASS FUEL

(75) Inventor: Philippe R. Murcia, Greenwich, CT (US)

(73) Assignee: Ecoem, L.L.C., Greenwich, CT (US)

(*) Notice: Subject to any disclaimer, the term of this patent is extended or adjusted under 35 U.S.C. 154(b) by 0 days.

(21) Appl. No.: 10/756,602

(22) Filed: Jan. 13, 2004

(65) Prior Publication Data

US 2004/0159042 A1 Aug. 19, 2004

Related U.S. Application Data

(60) Provisional application No. 60/445,340, filed on Feb. 6, 2003.

(51) Int. Cl.$^7$ ................................................. C10L 5/40
(52) U.S. Cl. ........................... 44/550; 44/590; 44/606
(58) Field of Search .......................... 44/550, 589, 590, 44/606, 629, 634, 635, 636

(56) References Cited

U.S. PATENT DOCUMENTS

| | | |
|---|---|---|
| 3,227,530 A | 1/1966 | Levelton |
| 3,635,684 A | 1/1972 | Seymour |
| 3,843,336 A | 10/1974 | Messman |
| 3,961,913 A | 6/1976 | Brenneman et al. |
| 4,015,951 A | 4/1977 | Gunnerman |
| 4,036,920 A | 7/1977 | Chihiro et al. |
| 4,043,764 A | 8/1977 | Loas |
| 4,094,740 A | 6/1978 | Lang |
| 4,229,183 A | 10/1980 | Eneroth et al. |
| 4,236,897 A | 12/1980 | Johnston |
| 4,245,999 A | 1/1981 | Reiniger |
| 4,249,471 A | 2/1981 | Gunnerman |
| 4,308,033 A | 12/1981 | Gunnerman |
| 4,321,328 A | 3/1982 | Hoge |
| 4,326,854 A | 4/1982 | Tanner |
| 4,360,378 A | 11/1982 | Lindstrom |
| 4,485,584 A | 12/1984 | Raulerson et al. |
| 4,529,407 A | 7/1985 | Johnston et al. |
| 4,530,700 A | 7/1985 | Sawyer et al. |
| 4,532,873 A | 8/1985 | Rivers et al. |
| 4,589,356 A | 5/1986 | Adams et al. |
| 4,589,357 A | 5/1986 | Lincoln et al. |
| 4,589,887 A | 5/1986 | Aunsholt |
| 4,596,584 A | 6/1986 | Darby |
| 4,613,339 A | 9/1986 | Gunnerman et al. |
| 4,618,736 A | 10/1986 | Benn et al. |
| 4,822,379 A | 4/1989 | Thompson |
| 4,908,044 A | 3/1990 | Brangardt |
| 4,929,252 A | 5/1990 | Brillhart |
| 4,983,698 A | 1/1991 | Robinson et al. |
| 5,026,442 A | 6/1991 | Yabsley et al. |
| 5,047,332 A | 9/1991 | Chahal |
| 5,096,462 A | 3/1992 | Schulz et al. |
| 5,130,092 A | 7/1992 | Liu |
| 5,244,472 A | 9/1993 | Simmons |
| 5,264,009 A | 11/1993 | Khan |
| 5,308,365 A | 5/1994 | Kesling, Jr. et al. |

(List continued on next page.)

FOREIGN PATENT DOCUMENTS

| | | |
|---|---|---|
| FR | 1600617 | * 12/1968 |
| FR | 2753927 | * 4/1998 |

*Primary Examiner*—Cephia D. Toomer
(74) *Attorney, Agent, or Firm*—Gibbons, Del Deo, Dolan, Griffinger & Vecchione

(57) ABSTRACT

An organically clean biomass fuel formed of mixture of a powder, which may be either dried, cellulosic product, wood charcoal powder, and/or a combination of the two, and a fluid, which may be vegetable oil, vegetable alcohol or a combination of the two. A centrifugal machine dries moist, cellulosic product and extracts black liquor. A grinder transforms the dried, cellulosic product into powder. Gum may be extracted from the vegetable oil or vegetable alcohol. A batch mixer or vibrating vessel mixes the powder and the fluid together; the fluid moisturizes the powder. Depending upon the relative amount of the fluid as compared to powder, the mixture will either be in a liquid cream state or a doughy state. If the latter, the mixture may be pressed into briquettes or ingots.

24 Claims, 1 Drawing Sheet

U.S. PATENT DOCUMENTS

| | | |
|---|---|---|
| 5,910,454 A | 6/1999 | Sprules |
| 5,942,170 A * | 8/1999 | Peitz .................. 264/40.6 |
| 6,138,381 A | 10/2000 | Abyhammar |
| 6,506,223 B2 | 1/2003 | White |
| 6,508,849 B1 | 1/2003 | Comas |
| 2003/0221363 A1 | 12/2003 | Reed |
| 2004/0035046 A1 | 2/2004 | Weissman et al. |

* cited by examiner

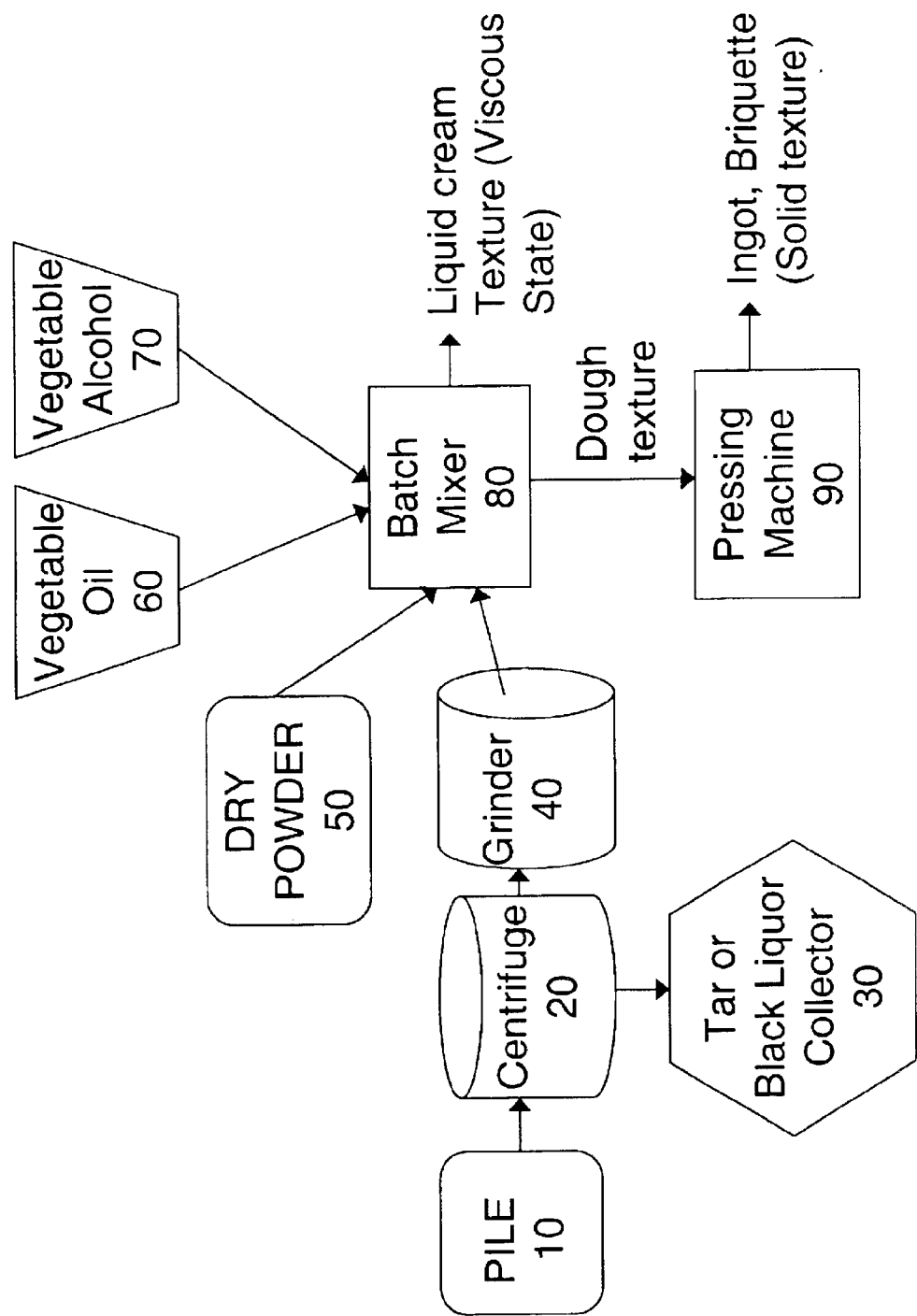

ORGANICALLY CLEAN BIOMASS FUEL

CROSS-REFERENCE TO PENDING PATENT APPLICATIONS

The present application claims the benefit of priority from U.S. provisional patent application Ser. No. 60/445,340, filed Feb. 6, 2003.

BACKGROUND OF THE INVENTION

1. Field of the Invention

The present invention relates to an organically clean biomass fuel from a mixture of finely ground wood chips, bark, sawdust, wood charcoal powder or other any other cellulosic products that are dried and then moisturized by vegetable oil and/or vegetable alcohol. The organically clean biomass fuel is clean burning and non-toxic.

2. Description of Related Art

U.S. Pat. No. 5,244,472 (the '472 patent) reveals the preparation of a chemically dried cellulosic fuel. Wood chips, bark, sawdust or other cellulosic products are dried and impregnated with vegetable oil to provide a clean burning, non-toxic fuel for lighting or starting charcoal. To achieve this, the cellulosic products are ground between ¼ and 2 inches in diameter and immersed in hot oil at between 325° F. and 375° F. (163° C.–191° C.). Moisture within the cellulosic products evaporates and replaced by the hot oil. Contaminants in the hot oil may be released upon heating.

There are over 350 species of oleaginous, or oil-producing plants and thousands of sub-species. Two types of oil presses are used in both small and large scale vegetable oil processing. The most common type of oil press is the screw press. This press uses a large scale diameter screw inside a metal housing. The oil seed is fed into the top of the press and falls into the churning screw. As the seed is churned into a mash by turning threads of the screw, the oil is squeezed from the meal, or cake. The protein cake from the oilseed oozes from the side of the press and the vegetable oil dribbles from the bottom of the press.

Screw presses are available in sizes ranging from table-top models that produce 8 kilograms of seed per hour (2 liters of oil) to industrial models which can produce 4,000 kilograms of oil per day. Screw presses are available in electrical and Diesel powered models. Screw presses tend to be slow. A ram press is more efficient oil press design. This press uses a hydraulic piston inside of a cylinder to crush the oilseed. Ram presses can be powered by hand, by an electric motor, or by a Diesel engine.

After a vegetable oil is pressed, it is left to settle for a few days in horizontal settling tank. The vegetable gums and pieces of meal cake settle to the bottom of the tank. If it is to be used as a fuel, it should be pumped through a series of filters. Usually it is a four stage process, starting with 150 micron mash, then 70, then 25 and lastly a 10 micron fuel filter.

An ester is a hydrocarbon chain that, for certain compounds such as alcohol or amine, will bond with another molecule. A vegetable oil molecule is made of three esters attached to a molecule of triglycerin. Vegetable oil is also called glycerol esters. About 20% of a vegetable oil molecule is glycerin. Glycerin is also called glycerine. Glycerin makes vegetable oil thick and sticky. To transform vegetable oil into fuel, vegetable oil must go through the process of transesterification. Transesterefication is the transformation of one type ester into another type of ester. The esters in vegetable oil are separated from the glycerin, the glycerin is replaced with alcohol. Either ethanol alcohol or methanol alcohol can be used. Ethanol is alcohol made from grain. Methanol is an alcohol that can be made from wood or coal. Methanol produces more stable biodiesel reactions. However, methanol is an aggressive alcohol which dissolves rubber, can be fatal is swallowed, and requires extreme caution when handled.

The cloud point is point at which vegetable oil appears cloudy because wax crystals form in the vegetable oil –60–25 F (16 and –4 C). The pour point—oil ceased to move through pipes and tubes ~–10 F. The gel point—oil will become the consistency of petroleum jelly ~–20 F. To overcome these obstacles, winterizing agents, anti-gel formula and flow—improver additive can be used. The flash point (ignition temperature) is above 300 F. The energy capacity is approximately 30 megajoules of energy per kilogram of the vegetable oil.

Emission Characteristics of vegetable oil as a fuel source as compared to regular fuel oil include the following:

Produces no sulfur dioxide ($SO_2$)

No net carbon dioxide ($CO_2$). "Net" in the sense that for each kilogram of fuel burned, up to three kilograms of carbon dioxide are consumed by the plants.

Less soot by 50%

Less carbon monoxide (CO) by 50%

Less hydrocarbon (HC) by 40%

Less polycyclic aromatic hydrocarbons (PAHs), specifically:
  Phenanthren by 97%
  Benzofloroanthen by 56%
  Benzaperyren by 71%
  Aldehydes by 15%

For purposes of this application, the phrase "vegetable alcohol" will refer to ethanol alcohol, methanol alcohol, a combination of each, or other forms of alcohol derived from vegetable oil after undergoing transesterification.

The inventor has a patent application pending on the manufacture and composition of wood charcoal, namely, U.S. Ser. No. 058677, publication no. 20020148716 entitled Portable Kiln for Making Charcoal from Forestry Wood Waste. The contents of that patent application are incorporated by reference.

The inventor has found that a moisture laden cellulosic product may be ground only to a certain size in a conventional grinder. This is because the moisture causes the cellulosic product to become sticky and thus cling to the surfaces of the grinder. Such may explain why the '472 patent only proposes grinding at the lower range to ¼ inch diameter.

Granular cellulose powder is available commercially and used in the plastic, welding electrode, rubber and filter industries as commercialized by Micro-Technik GmbH & Co. KG. It offers granular cellulose powder, such as those with the following characteristics:

Grade-402-100

| Analysis: | from ... to | Method |
|---|---|---|
| Cellulose content (atro) | min. 99% | Statement by producer |
| α-content | 88–90% | Statement by producer |
| Water content | <6% | 4 h drying at 105° C. |
| DP | 600–1400 | Cuoxam method by Staudinger |
| pH Value in a 5% slurry | 5–7,5 | Potentiometrically |

-continued

| Analysis: | from . . . to | Method |
|---|---|---|
| Ash content | 0.1–0.2% | Glow in a platinum crucible |
| Bulk density | 150–180 g/l | Filling up a 0.5 l graduated cylinder |
| Fiber length | max. 100 μm | By mikroscope |
| Fiber diameter | ca. 20 μm | By mikroscope |

Grade: 402-2b:

| Analysis: | from . . . to | Method |
|---|---|---|
| Water content | <6% | 4 h drying at 105° C. |
| α-Content | 88–90% | Statement by producer |
| pH Value in a 5% slurry | 5–7.5 | Potentiometrically |
| Ash content | max. 0.5% | Glow in a platinum crucible |
| Bulk density | 180–300 g/l | Filling up a 0.5 l graduated cylinder |
| Water Content | <6% | 4 h drying at 105° C. |
| DP | 600–1400 | Cuoxam method by Staudinger |
| pH Value in a 5% slurry | 4.9–5.3 | Potentiometrically |
| Ash Content | 0.1–0.2% | Glow in a platinum crucible |
| Resin Content | 0.2–0.4% | Extraction with isopropanol |
| Bulk Density | >100 g/l | Filling up a 0.5 l graduated cylinder |
| Acid Extract | 0.5–0.8% | With 0.01 n HCl at room temperature |
| Max. Fiber Length | max. 200 μm | By microscope |
| Fiber Diameter | about 20 μm | By microscope |
| Specific Surface | 3500–6000 cm$^2$/g | Multi-Point BET |

Grade 402-1000:

| Analysis | from . . . to | Method |
|---|---|---|
| Water Content | <6% | 4 h drying at 105° C. |
| α-Content | 88–90% | According to producer |
| DP | 600–1400 | Cuoxam method by Staudinger |
| pH Value in a 5% slurry | 4.9–5.3 | Potentiometrically |
| Ash Content | 0.1–0.2% | Glow in a platinum crucible |
| Resin Content | 0.2–0.4% | Extraction with isopropanol |
| Bulk Density | 80–100 g/l | Filling up a 0.5 l graduated cylinder |
| Acid Extract | 0.5–0.8% | With 0.01 n HCl at room temperature |

Sieve Analysis:

| >40 μm | max. 60% | Alpine air jet sieve, |
|---|---|---|
| >100 μm | max. 25% | 10 min/sieve |
| >300 μm | max. 1% | |
| >600 μm | 0% | |
| Average fibre length | 100–300 μm | |

Grade 402-1400

| Analysis | from . . . to | Method |
|---|---|---|
| Water Content | <6% | 4 h drying at 105° C. |
| α-Content | 88–90% | According to producer |
| DP | 600–1400 | Cuoxam method by Staudinger |
| pH Value in a 5% slurry | 4.9–5.3 | Potentiometrically |
| Ash Content | 0.1–0.2% | Glow in a platinum crucible |

-continued

| Analysis | from . . . to | Method |
|---|---|---|
| Resin Content | 0.2–0.4% | Extraction with isopropanol |
| Bulk Density | 50–80 g/l | Filling up a 0.5 l graduated cylinder |
| Acid Extract | 0.5–0.8% | With 0.01 n HCl at room temperature |

Sieve Analysis

| >100 μm | max. 50% | Alpine air jet sieve, |
|---|---|---|
| >200 μm | max. 10% | 10 min/sieve |
| >400 μm | max. 1% | |
| >800 μm | 0% | |
| Average fibre length | 200–500 μm | |

It would therefore be desirable to provide a fuel from cellulosic products and/or wood charcoal that was in the form of powder moisturized by vegetable oil and/or vegetable alcohol. Preferably, the cellulosic products each have a diameter significantly smaller than 1/256 inch, e.g., on the microscopic size of a powder such as that of flour grains. For the purpose of this application, "cellulosic powder" are those which have an average fiber length of about 500 micrometers or less A fiber length within the range of 20–500 micrometers is suitable.

SUMMARY OF THE INVENTION

One aspect to the invention resides in a fuel that is a mixture of cellulosic powder and/or wood charcoal powder that is moisturized by vegetable oil and/or vegetable alcohol. Black liquor and/or tar is removed from the powder and preferably gum is removed from the fluid to render the mixture organically clean and non-toxic. Another aspect resides in a method of drying cellulosic particles to reduce their moisture content and extract black liquor or tar from them, grinding the dried, cellulosic particles into the powder, moisturizing the powder with vegetable oil and/or vegetable alcohol, and mixing the same. The amount of moisturizing determines whether the fuel will have a liquidy cream texture or a doughy texture. If the former, the fuel is a viscous liquid that may be poured into a liquid-tight container. If the latter, the fuel may be bagged or boxed or pressed into briquettes or ingots.

BRIEF DESCRIPTION OF THE DRAWING

For a better understanding of the present invention, reference is made to the following description and accompanying drawing, while the scope of the invention is set forth in the appended claims. The drawing shows a schematic representation of equipment used to carry out the method and produce the micro cellulosic particles as fuel of the present invention.

DETAILED DESCRIPTION OF THE INVENTION

Turning to the drawing, cellulosic products, such as sawdust, dead leaves, small branches, bushes are cut grasses, are gathered in a pile 10. The pile is fed into a conventional centrifugal machine or centrifuge 20 that spins the pile and, at the same time, the centrifuge 20 is heated to dry the pile. The heating should be at a temperature less that 280° C., such as between 100° C. and 150° C., and may be done in any conventional manner. For instance, the centrifuge 20 may be heated by hot air or through solar heating, but preferably in a non-polluting manner.

The water in the cellulosic products is driven off before any vegetable oil is added to the cellulosic products. To evaporate water requires a lot of energy so that using the sun to pre-dry the pile 10 as much as possible before drying into the centrifuge 20 greatly improves efficiency.

If the wood is dry and heated to around 280° C., however, it begins to spontaneously break down to produce charcoal plus water vapor, methanol, acetic acid and more complex chemicals, chiefly in the form of tars and non-condensable gas consisting mainly of hydrogen, carbon monoxide and carbon dioxide. Therefore, the centrifuge 20 is kept below 280° C. However, the centrifuge 20 should be heated to a high enough temperature so that black liquor or tar emerges from the cellulosic products to be collected in a tar or black liquor collector 30.

The dried cellulosic products are then fed to a conventional grinding machine or grinder 40, which chops the dried cellulosic products into powder. The powder size is of the same order of magnitude as that of grains of flour. As an alternative or in addition, dry powder 50 may be provided. This dry powder may be a commercially available cellulosic product with a low moisture content (less than 6%) or wood charcoal.

Vegetable oil 60, which may be derived from palm, sun flower, corn, soya bean, pumpkin, coconuts or other plants, and/or vegetable alcohols (such as those used to form biodiesel), may be used to moisturize the ground, dried cellulosic powder from the grinder 40 and/or the dry powder 50. If desired, the vegetable oil and vegetable alcohols may be in a purified state so as to be freer of potential pollutants and yet maintain the integrity of the oil as fluid. This purified state may entail the extraction of gum by filtering. Gum left in the vegetable oil may cause damage to equipment that uses the vegetable oil as a fuel source. The purified vegetable oil and/or vegetable alcohols or a mixture of the two are used to moisturize the powder so that the moisturized powder approximates the characteristics of a biodiesel fuel, but having a high caloric content attributed to the powder.

The ground, dried cellulosic powder from the grinder 40 and/or the dry powder 50 are fed into a conventional batch mixer 80 (or a conventional vibrating vessel). The vegetable oil from container 60 and/or the vegetable alcohol from container 70 are used to moisturize the ground, dried cellulosic powder and/or dry powder in the batch mixer 80. The vegetable oil and/or vegetable alcohol is added by micro drops, preferably, to help assure that the desired amount is added and mixed thoroughly with the powder.

The batch mixer 80 may be that of a conventional batch mixer that moisturizes flour with water and other ingredients in bakeries. The micro-droplets may be sprayed to moisturize the dried power to form an organically clean biomass that is of dough or of a liquid cream texture, depending upon the amount of moisture being added to the dried powder. The organically clean biomass fuel is clean burning and non-toxic.

For instance, adding 1 to 2 gallons of the bio-diesel product per ton of dried powder would yield a dough texture, while adding 5 to 10 gallons of the bio-diesel product per ton of dried powder would yield a liquid cream texture. By forming the dough texture, the fuel substance may be bagged or boxed in 1 to 5 ton packages or be fed into a conventional pressing machine to be pressed into briquettes of 2 to 2.5 inches in diameter or be pressed into an ingot of 2 to 5 pounds, for instance. By forming the liquidy creamy texture, the fuel substance is in a viscous, liquidy state that may be poured into a liquid-tight container and may serve as a replacement or additive to conventional liquid fossil fuels, such as for heating purposes.

While the foregoing description and drawings represent the preferred embodiments of the present invention, it will be understood that various changes and modifications may be made without departing from the scope of the present invention.

What is claimed is:

1. An organically clean biomass fuel, comprising a mixture of a powder and a fluid, the powder having an average fiber length of at most 500 micrometers and including a constituent selected from a group consisting of a cellulosic powder, a wood charcoal powder, and any combination thereof, the fluid including a constituent selected from a group consisting of a vegetable oil, a vegetable alcohol and any combination thereof, the powder being substantially free of black liquor and tar, wherein the fluid is substantially free of gum.

2. An organically clean biomass fuel of claim 1, wherein the mixture is in a pressed state forming a briquette.

3. An organically clean biomass fuel of claim 1, wherein the mixture is in a pressed state forming an ingot weighing at least two pounds.

4. An organically clean biomass fuel of claim 1, wherein the mixture is in a doughy state at room temperature.

5. An organically clean biomass fuel of claim 1, wherein the mixture is in a viscous, liquidy cream state at room temperature.

6. A method of forming an organically clean biomass fuel, comprising mixing a powder having an average fiber length of at most 500 micrometers with a fluid that moisturizes same to form a mixture that constitutes the organcially clean biomass fuel, the powder including a constituent selected from a group consisting of cellulosic powder, wood charcoal powder and any combination thereof, the fluid including a constituent selected from a group consisting of vegetable oil, vegetable alcohol, and any combination thereof, the powder being substantially free of black liquor and tar, the fluid being substantially free of gum.

7. A method of claim 6, further comprising drying a cellulosic product and grinding same to form the cellulosic powder, and extracting black liquor from the cellulosic product.

8. A method of claim 6, wherein the moisturizing includes spraying the fluid in micro droplets onto the powder.

9. A method of claim 6, further comprising mixing the powder and fluid to provide a doughy texture.

10. A method of claim 6, further comprising bagging or boxing the mixture with the doughy texture.

11. A method of claim 10, further comprising pressing the mixture with the doughy texture into at least one of ingots and briquettes.

12. A method of claim 6, further comprising mixing the powder and the fluid into a mixture having a viscous, liquidy cream state at room temperature.

13. A method of claim 12, further comprising pouring the mixture into a liquid-tight container.

14. An organically clean biomass fuel, comprising a mixture of a powder and a fluid, the powder having an average fiber length of at most 500 micrometers and including a constituent selected from a group consisting of a cellulosic powder, a wood charcoal powder, and any combination thereof, the fluid including a constituent selected from a group consisting of a vegetable oil, a vegetable alcohol and any combination thereof, the powder being substantially free of black liquor and tar, wherein the mixture is in a pressed state forming a briquette.

15. An organically clean biomass fuel, comprising a mixture of a powder and a fluid, the powder having an average fiber length of at most 500 micrometers and including a constituent selected from a group consisting of a cellulosic powder, a wood charcoal powder, and any combination thereof, the fluid including a constituent selected from a group consisting of a vegetable oil, a vegetable alcohol and any combination thereof, the powder being substantially free of black liquor and tar, wherein the mixture is in a viscous, liquidy cream state at room temperature.

16. A method of forming an organically clean biomass fuel, comprising mixing a powder having an average fiber length of at most 500 micrometers with a fluid that moisturizes same to form a mixture that constitutes the organically clean biomass fuel, the powder including a constituent selected from a group consisting of cellulosic powder, wood charcoal powder and any combination thereof, the fluid including a constituent selected from a group consisting of vegetable oil, vegetable alcohol, and any combination thereof, the powder being substantially free of black liquor and tar, further comprising drying a cellulosic product and grinding same to form the cellulosic powder, and extracting black liquor from the cellulosic product.

17. A method of forming an organically clean biomass fuel, comprising mixing a powder having an average fiber length of at most 500 micrometers with a fluid that moisturizes same to form a mixture that constitutes the organically clean biomass fuel, the powder including a constituent selected from a group consisting of cellulosic powder, wood charcoal powder and any combination thereof, the fluid including a constituent selected from a group consisting of vegetable oil, vegetable alcohol, and any combination thereof, the powder being substantially free of black liquor and tar, further comprising mixing the powder and the fluid into a mixture having a viscous, liquidy cream state at room temperature.

18. A method of using an organically clean biomass fuel, comprising the steps of providing an organically clean biomass fuel, the organically clean biomass fuel being a mixture of a powder and a fluid;

the powder having an average fiber length of at most 500 micrometers and including a constituent selected from a group consisting of a cellulosic powder, a wood charcoal powder, and any combination thereof, the fluid including a constituent selected from a group consisting of a vegetable oil, a vegetable alcohol and any combination thereof, the powder being substantially free of black liquor and tar, the fluid being substantially free of gum; and clean burning the organically clean biomass fuel.

19. A method of claim 18, wherein the providing includes providing the organically clean biomass fuel to have a form of a briquette.

20. A method of claim 18, wherein the providing includes providing the organically clean biomass fuel to have a form of an ingot weighing at least two pounds.

21. A method of claim 18, wherein the providing includes providing the organically clean biomass fuel to have a form of a doughy state at room temperature.

22. A method of claim 18, wherein the providing includes providing the organically clean biomass fuel to have a form of a viscous, liquidy state at room temperature.

23. A method of claim 18, further comprising pouring the organically clean biomass fuel into a liquid-tight container.

24. A method of claim 6, further comprising pouring the organically clean biomass fuel into a liquid-tight container.

* * * * *

UNITED STATES PATENT AND TRADEMARK OFFICE
CERTIFICATE OF CORRECTION

PATENT NO. : 6,818,027 B2 Page 1 of 1
DATED : November 16, 2004
INVENTOR(S) : Philippe R. Murcia It is certified that error appears in the above-identified patent and that said Letters Patent is hereby corrected as shown below:

<u>Column 6,</u>
Line 35, change "organcially" to -- organically --.

<u>Column 7,</u>
Lines 18 and 31, change "cially" to -- ically --.

Signed and Sealed this

Twenty-sixth Day of April, 2005

JON W. DUDAS
*Director of the United States Patent and Trademark Office*